Jan. 2, 1951

G. A. LOCKE 2,536,193

TIME INTERVAL MEASURING DEVICE

Filed April 16, 1945

INVENTOR
G. A. LOCKE
BY R. C. Terry
ATTORNEY

Jan. 2, 1951 G. A. LOCKE 2,536,193
TIME INTERVAL MEASURING DEVICE
Filed April 16, 1945 5 Sheets-Sheet 2

FIG. 2

INVENTOR
G. A. LOCKE
BY R. C. Terry
ATTORNEY

FIG. 6

Patented Jan. 2, 1951

2,536,193

UNITED STATES PATENT OFFICE 2,536,193

TIME INTERVAL MEASURING DEVICE

George A. Locke, Glenwood Landing, N. Y., assignor to Bell Telephone Laboratories, Incorporated, New York, N. Y., a corporation of New York Application April 16, 1945, Serial No. 588,526

19 Claims. (Cl. 346—33)

This invention relates to time interval measuring devices and particularly to a system for the measurement of intervals between key-lever manipulations in keyboard operating technique.

More specifically, the invention relates to the measurement of the interval between ending of transmission of one and the beginning of transmission of the next of any two successive telegraph code combinations transmitted under the control of a keyboard transmitter.

An object of the invention is to measure the intervals between successively transmitted code combinations.

Another object of the invention is to measure the interval as an accumulation of discrete increments of time.

Another object of the invention is to accumulate increments of fixed and equal duration until a predetermined number of increments has been accumulated and thereafter to accumulate increments of progressively greater duration.

Another object of the invention is to record characters representative of the duration of each interval timed.

Another object of the invention is to provide a predetermined upper limit of intervals to be measured and to represent all intervals exceeding the limit by a single character.

In accordance with the preferred embodiment of the invention, signals generated by a keyboard transmitter are received by a receiving relay and are repeated by the relay to a teletypewriter printer which records characters corresponding to the received signals. A relay for controlling the timing mechanism is also responsive to the signal. The latter relay, upon responding to the start impulse of a received code combination, disables a normally operative start-stop oscillator and also recycles a character timing circuit which holds the oscillator disabled for the interval of one code combination. When the stop impulse of the code combination is received the character has timed out and the oscillator is restarted.

The oscillator is coupled to a detector which derives impulses at the rate of one per cycle of the oscillator. The impulses are applied to a counting chain of electron discharge tubes, the tubes being activated in succession at equal intervals, these intervals being the fixed and equal increments of time hereinbefore mentioned. As each tube is activated it operates a relay which transfers an energizing path from a coding relay associated with the transfer relay to the armature of the transfer relay controlled by the next tube in the counting chain.

The last tube in the counting chain operates two relays one of which is a transfer relay and the other of which activates a condenser charging circuit. The grids of a plurality of grid-controlled tubes representing a secondary counting chain are connected to the condenser charging circuit so that the grids become increasingly and equally positive in unison with the charging of the condenser. The cathodes of the tubes in the secondary counting chain are progressively more positive from beginning to end of the chain, and are initially sufficiently positive that none of the tubes in the secondary counting chain is conductive. As the condenser charges the grids render the tubes conductive in succession and each tube operates a transfer relay which transfers the previously mentioned energizing path from a coding relay associated with each transfer relay to the armature of the transfer relay associated with the next tube in the chain. The transfer relay associated with the last tube in the secondary counting chain is operable to transfer the energizing path from the coding relay primarily associated with it to a final coding relay.

Each of the coding relays is operable to activate a set of storage relays which in turn set up a permutation code combination on the contacts of a local telegraph transmitter. Preferably these codes are assigned in a convenient order, such as an alphabetical order beginning with the letter A for the coding relay controlled by the transfer relay associated with the first counting tube in the first counting chain. The local transmitter is connected to a teletypewriter printer for recording the characters corresponding to the codes set up on the transmitter contacts under the control of the coding relays.

Upon reception of the start impulse of a code combination generated by the keyboard transmitter, the oscillator is again stopped, the energizing path through the armatures and front contacts of all operated transfer relays and through the armature and back contact of the first unoperated transfer relay to its associated coding relay is completed so that the coding relay is operated to set up its code through the storage relays on the transmitter contacts, and the transmitter is set in operation for one code cycle. The character corresponding to the code is thereupon recorded by the teletypewriter printer associated with the local transmitter. Following the storing of the character in the storage relays and the starting of the local transmitter, the counting tubes are extinguished, the operated transfer relays and the operated coding relay are released and the system awaits the next counting operation to be initiated by the restarting of the oscillator upon reception of the stop impulse at the end of the code combination received from the keyboard transmitter.

The character recorded under the control of the coding relay which was operated is indicative of the interval elapsing between the end of one signal combination, at which time the keyboard transmitter could have been operated to transmit another signal combination, and the beginning of the next signal combination transmitted. If the letter A is printed, this indicates that the interval elapsing between the two signal combinations is not greater than one increment of time recognizable by the primary counting chain. If the letter B is printed, this indicates that the interval exceeds one increment but does not exceed two increments of time. If the interval extends beyond the number of increments of time which the first counting chain is adapted to count, the character printed will represent an interval comprising the total of the fixed and equal increments recognized by the first counting chain plus one or more of the unequal increments of time recognized by the second counting chain under the control of the condenser charging circuit. The printing of the character represented by the last coding relay indicates that the inerval is of an indeterminate duration exceeding any interval which the system is adapted to measure.

The copy produced by the printer associated with the local transmitter may be compared with the copy produced by the printer which receives signals from the keyboard transmitter for the purpose of allocating the characters representing the intervals between signals transmitted by the keyboard transmitter to the characters representing those signals. In this way it may be determined whether individual operators of keyboard mechanisms exhibit unusual or characteristic delays in reaching and operating certain key levers on the keyboard, and by means of special training and extensive practice, faults or undesirable habits in keyboard techniques of operators may be corrected.

For a complete understanding of the invention reference may be had to the following detailed description to be interpreted in the light of the accompanying drawings in which.

Figure 1:
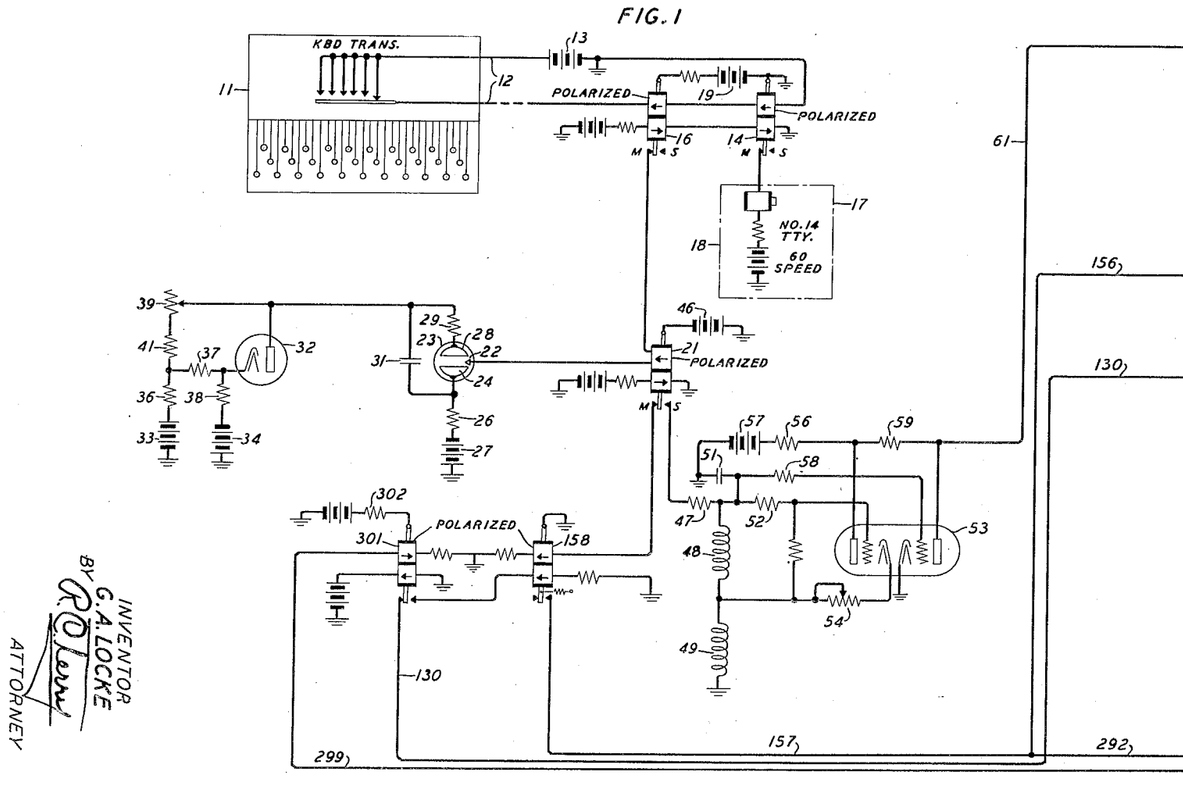
Figs. 1, 2, 3 and 4, contained on separate sheets, when arranged as shown in Fig. 5, show a complete time interval measuring system in accordance with the present invention.

Referring now to the drawings and particularly to Fig. 1, the reference numeral 11 designates a keyboard controlled transmitter of start-stop permutation code telegraph signals which may be of the type shown in Patent 1,595,472 granted August 10, 1926 to H. L. Krum. The disclosure of the foregoing patent is incorporated herein by reference, to the same extent as if the disclosure thereof had been embodied herein in full. Keyboard transmitter 11 is connected to telegraph lines 12 which include battery 13 and which extend to and include at the receiving end biased polar receiving relays 14 and 16. Keyboard transmitter 11 and receiving relays 14 and 16 may be located in one office, or keyboard transmitter 11 may be located at a station distant from the one at which relays 14 and 16 are located.

The armature of receiving relay 14 is connected to ground and the marking contact thereof is connected to one terminal of the selector magnet of a teletypewriter printer 17, the other terminal of which is connected to battery 18. Teletypewriter printer 17 may be of the type shown in Patent 1,745,633 granted February 4, 1930 to S. Morton et al. or it may be of the type shown in Patent 1,904,164 granted April 18, 1933 to S. Morton et al. The disclosures of either or both of these patents are incorporated herein by reference to the same extent as if fully included herein. Signals transmitted from keyboard transmitter 11 will be received by receiving relay 14 and will be repeated to teletypewriter printer 17 which will record the characters and perform the functions corresponding to the signals.

Receiving relay 16 which responds to the signals in the same manner as relay 14 has its armature connected to the positive terminal of grounded battery 19 and its marking contact connected through the operating winding of biased polar relay 21 to the main anode 22 of a cold cathode gas-filled electron discharge tube 23. The cathode 24 of tube 23 is connected through resistor 26 to the negative terminal of grounded battery 27. The control anode 28 of tube 23 is connected through resistor 29 and condenser 31 to the cathode of the tube and is also connected through resistor 29 to the anode of a diode electron discharge tube 32 which is preferably a vacuum tube.

A potential difference for operating tube 32 is derived from batteries 33 and 34 interconnected by a potential divider comprising resistors 36, 37 and 38. The cathode of tube 32 is connected to the junction of resistors 37 and 38 and the anode of the tube is connected through variable resistor 39 and fixed resistor 41 to the junction of resistors 36 and 37. Assuming that relay 16 is in the marking condition and has been in this condition for some time and that gas-filled tube 23 is conductive the current flowing in the main gap of tube 22 maintains the lower terminal of condenser 31 at a substantially positive potential due to the low voltage drop in this type of tube. At this time the upper terminal of condenser 31 is maintained at a slightly less positive potential, the difference being the voltage drop across resistor 29. Thus condenser 31 has only a very small charge. Upon the reception by relay 16 of the start impulse of a permutation code signal combination, the armature of that relay will move to the spacing contact, interrupting the anode circuit of tube 23 and quenching that tube. Upon the quenching of tube 23 the cathode 24 of the tube and the lower terminal of condenser 31 swing toward negative potential and by virtue of the fact that condenser 31 has only a small charge between its plates the upper terminal is likewise carried negative. With the upper terminal of condenser 31 carried negative the anode of tube 32 is carried negative and this tube ceases to be conductive. Condenser 31 now begins to charge through resistors 36, 41 and 39 and the values of the resistors and of condenser 31 are such that the development of a potential across condenser 31 and therefore between the cathode 24 and control anode 28 of tube 23 sufficient to produce a discharge between these electrodes of the tube will not occur until one permutation code character interval after the quenching of tube 23 which is approximately .163 second at a printing telegraph operating frequency of sixty words per minute. If the armature of relay 16 is on the marking contact in response to the stop impulse, as it should be, at the time of the occurrence of a discharge between the cathode 24 and control anode 28 of tube 23, the discharge will transfer to the main gap of the tube. Upon the refiring of tube 23 the cathode 24 of the tube and the lower terminal of condenser 31 return to their initial substantially positive potential and due to the fact that condenser 31 is now charged positively on its upper terminal this terminal is carried positive, thus making the anode of tube 32 highly positive and causing the tube to become conductive. Tube 32 provides a low resistance path for the discharge of condenser 31 to its steady state condition of a very small charge which is positive on the lower terminal and negative on the upper terminal.

It will be apparent that tubes 23 and 32 comprise a character timing circuit for preventing the flow of current through the operating winding of relay 21, which is included in the anode circuit of tube 23, during the reception by relay 16 of significant impulses of marking nature contained in the code combination being received from transmitter 11, and for causing this winding to be reenergized at the end of a permutation code character interval when the stop impulse is received. Variable resistor 39 permits the timing of the character timing circuit to be adjusted so that the refiring of tube 23 may be accurately adjusted to the signaling frequency of transmitter 11.

Upon the quenching of tube 23 in the manner hereinbefore described current in the operating winding of relay 21 is interrupted and the armature of the relay is operated by the biasing winding to the spacing contact. The negative terminal of grounded battery 46 is connected to the armature of relay 21 and the spacing contact is connected through resistor 47 and serially connected inductively coupled coils 48 and 49 to ground. Under these circumstances a steady direct current will flow in the coils 48 and 49. Coils 48 and 49 together with condenser 51 connected in parallel therewith form an oscillatory circuit. The junction of resistor 47 and coil 48 is connected through resistor 52 to the grid of the left-hand triode section of electron discharge tube 53 and the junction of coils 48 and 49 is connected through variable resistor 54 to the cathode of the left-hand triode section of the tube. The anode of the left-hand triode section of the tube is connected through resistor 56 to the positive terminal of grounded battery 57.

With relay 21 operated to spacing and steady direct current flowing in coils 48 and 49 the grid of the left-hand triode section of tube 53 is negative with respect to the cathode by the potential difference across coil 48 and the tube is held non-conducting. Condenser 51 has a small voltage impressed across it due to the steady ohmic potential difference across coils 48 and 49 in series. This condition is maintained while the character is being timed by tube 23. Upon the refiring of tube 23 and reoperation of relay 21 to marking the energy stored in the magnetic field of coils 48 and 49 causes the circuit to begin to oscillate. The inductive value of coils 48 and 49 and the capacitative value of condenser 51 are preferably such that the circuit oscillates at approximately 150 cycles per second so that the duration of each cycle is approximately .007 second. A portion of the oscillatory voltage developed across coil 48 is applied between the grid and the cathode of the left-hand triode section of tube 53. This tube is being operated on the linear portion of its characteristic so that an oscillatory current results and this oscillatory current flows in the coil 49 which is connected in the return circuit between the cathode of the left-hand triode section of tube 53 and the anode battery 57. This induces an oscillatory current in the coil 48 through their mutual inductance, and thus the left-hand triode section of tube 53 serves to supply energy to replace that lost by resistive dissipation in the resonant circuit. The variable resistor 54 is adjusted so that oscillation continues at the amplitude at which it started.

The voltage developed across the resonant circuit is applied through resistor 58 to the grid of the right-hand triode section of tube 53 which has its cathode connected to ground. The anode of the right-hand triode section is connected through resistors 59 and 56 to battery 57 and the right-hand triode section of tube 53 serves as a detector. When the grid of the right-hand triode section of tube 53 is negative with respect to the cathode no current flows and when the grid is positive with respect to the cathode current flows through resistor 59 thus causing the potential of the anode of the right-hand triode section of the tube to rise and fall.

Figure 2:
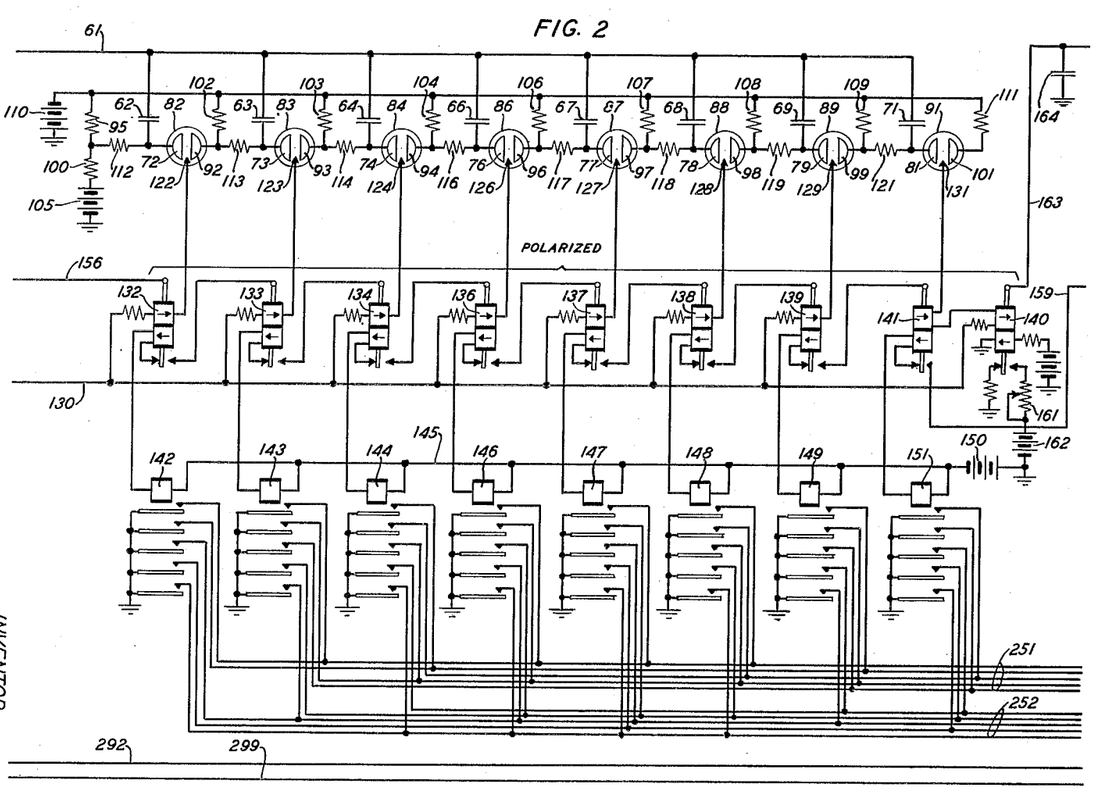

The anode of the right-hand triode section of the tube 53 is connected to conductor 61 which extends into Fig. 2 and is there connected to one terminal of each of the condensers 62, 63, 64, 66, 67, 68, 69 and 71. The other terminals of these condensers are connected to the control anodes 72, 73, 74, 76, 77, 78, 79 and 81, respectively of tubes 82, 83, 84, 86, 87, 88, 89 and 91, respectively, which may be similar to tube 23 in Fig. 1. Each time the anode of the detector section of tube 53 swings toward positive, a positive pulse is impressed through the condensers on the control anodes of the tubes with which they are associated.

The cathodes 92, 93, 94, 96, 97, 98, 99 and 101 of tubes 82, 83, 84, 86, 87, 88, 89 and 91, respectively, are connected through cathode resistors 102, 103, 104, 106, 107, 108, 109 and 111, respectively, to the negative terminal of grounded battery 110. The negative terminal of battery 110 is also connected through resistors 95 and 100 to the positive terminal of grounded battery 105. The junction of resistors 95 and 100 is connected by resistor 112 to the control anode 72 of tube 82. When tube 82 is not conductive, so that there is no potential difference across cathode resistor 102 the potential supplied to the control anode 72 of the tube from the junction of resistors 95 and 100 is insufficient to fire the tube. However, when a positive pulse is impressed through condenser 62 to the control anode 72 of tube 82 from conductor 61 the control anode is made sufficiently positive with respect to the cathode 92 to fire the tube. When tube 82 becomes conductive the potential difference across its cathode resistor 102 applies a priming potential through resistor 113 to the control anode 73 of tube 83 so that when the next positive pulse is impressed on condensers 62, 63, 64, 66, 67, 68, 69 and 71 tube 83 will be fired. In similar relation to the priming resistor 113, priming resistors 114, 116, 117, 118, 119 and 121 are connected between the cathodes and control anodes of succeeding tubes in the chain. From this it will be apparent that with none of the tubes in Fig. 2 conductive tube 82 will be fired in response to the first positive pulse impressed on the condenser, tube 83 will be fired in response to the second pulse, tube 84 will be fired in response to the third pulse and so on until all of the tubes have been fired so that the tubes will count the cycles of oscillation generated by the resonant circuit in Fig. 1. A chain of eight counting tubes has been shown in Fig. 2 but it will be understood that the chain may be extended or diminished as desired.

The main anode 122 of tube 82 is connected through the operating winding of a transfer relay 132 to conductor 130. Similarly, the main anodes 123, 124, 126, 127, 128 and 129 of tubes 83, 84, 86, 87, 88 and 89, respectively, are connected through the operating windings of transfer relays 133, 134, 136, 137, 138 and 139 to conductor 130. The main anode 131 of tube 91 is connected through the operating winding of transfer relay 141 and then serially through the operating winding of relay 140 to conductor 130. The left-hand or normal or back contact of transfer relay 132 is connected through the locking winding of that relay and through the winding of a coding relay 142 to conductor 145. Similarly, the corresponding contacts of relays 133, 134, 136, 137, 138, 139 and 141 are connected through their locking windings and through the windings of coding relays 143, 144, 146, 147, 148, 149 and 151, respectively, to conductor 145. Conductor 145 terminates at the negative terminal of grounded battery 150. The armature of relay 132 is connected to conductor 156 which extends into Fig. 1 and is connected to the right-hand contact of a relay 158. One terminal of the operating winding of relay 158 is connected to the marking contact of relay 21 and the other terminal is connected to ground. With relay 21 in the marking condition, which is the condition when the oscillatory circuit is in operation, the operating winding of relay 158 is energized and holds the grounded armature on the left-hand contact so that ground is not connected to conductor 156. Thus in the condition of the system shown in Figs. 1 and 2 there is no energizing circuit for the locking winding of relay 132 and the winding of relay 142.

The right-hand or off-normal or front contact of relay 132 is connected to the armature of relay 133. Thus when tube 82 operates relay 132 the conductive path including conductor 156 is disconnected from the locking winding of relay 132 and the winding of relay 142 and is extended to the locking winding of relay 133 and the winding of relay 143. Similarly the right-hand contacts of relays 133, 134, 136, 137, 138 and 139 are connected to the armatures of relays 134, 136, 137, 138, 139 and 141, respectively, so that as each of these relays is operated in turn it disables its own locking winding and associated coding relay and prepares an energizing circuit for the locking winding of the following transfer relay and associated coding relay. The right-hand contact of transfer relay 141 is connected to conductor 159 which extends into Fig. 3.

The left-hand or normal contact of relay 140 is connected to ground and the right-hand or off-normal contact is connected through variable resistor 161 to the positive terminal of grounded battery 162. The armature of relay 140 is connected through conductor 163 to one terminal of condenser 164, the other terminal of which is connected to ground. Conductor 163 extends into Fig. 3 and is connected through current limiting resistors 171, 172, 173, 174, 175, 176, 177, 178 and 179 to the grids of electron discharge tubes 181, 182, 183, 184, 185, 186, 187, 188 and 189, respectively. These tubes are preferably vacuum triode tubes.

A potential divider comprising resistors 201, 211 and 221 is connected between the positive terminal of grounded battery 200 and ground. The anode of tube 181 is connected through the operating winding of transfer relay 191 to the junction of resistors 201 and 211 and the cathode is connected to the junction of resistors 211 and 221. Resistor 221 provides a positive potential of the cathode of tube 181 relative to ground of about 12 volts. Resistor 211 provides a positive potential of the anode of tube 181 relative to the cathode of about 100 volts. Thus with the armature of relay 140 on its normal contact and condenser 164 discharged, the grid of tube 181 has a negative bias of about 12 volts and the tube is cut off.

Tube 182 has its anode and cathode similarly associated with the operating winding of the transfer relay 192 and with a potential divider comprising resistors 202, 212 and 222. Similarly tube 193 is associated with the transfer relay 193 and with a potential divider comprising resistors 203, 213 and 223, tube 184 is associated with a transfer relay 194 and with a potential divider comprising resistors 204, 214 and 224, tube 185 is associated with a transfer relay 195 and with a potential divider comprising resistors 205, 215 and 225, tube 186 is associated with a transfer relay 196 and with a potential divider comprising resistors 206, 216 and 226, tube 187 is associated with a transfer relay 197 and with a potential divider comprising resistors 207, 217 and 227, tube 188 is associated with a transfer relay 198 and with a potential divider comprising resistors 208, 218 and 228, and tube 189 is associated with a transfer relay 199 and with a potential divider comprising resistors 209, 219 and 229.

Figure 3:
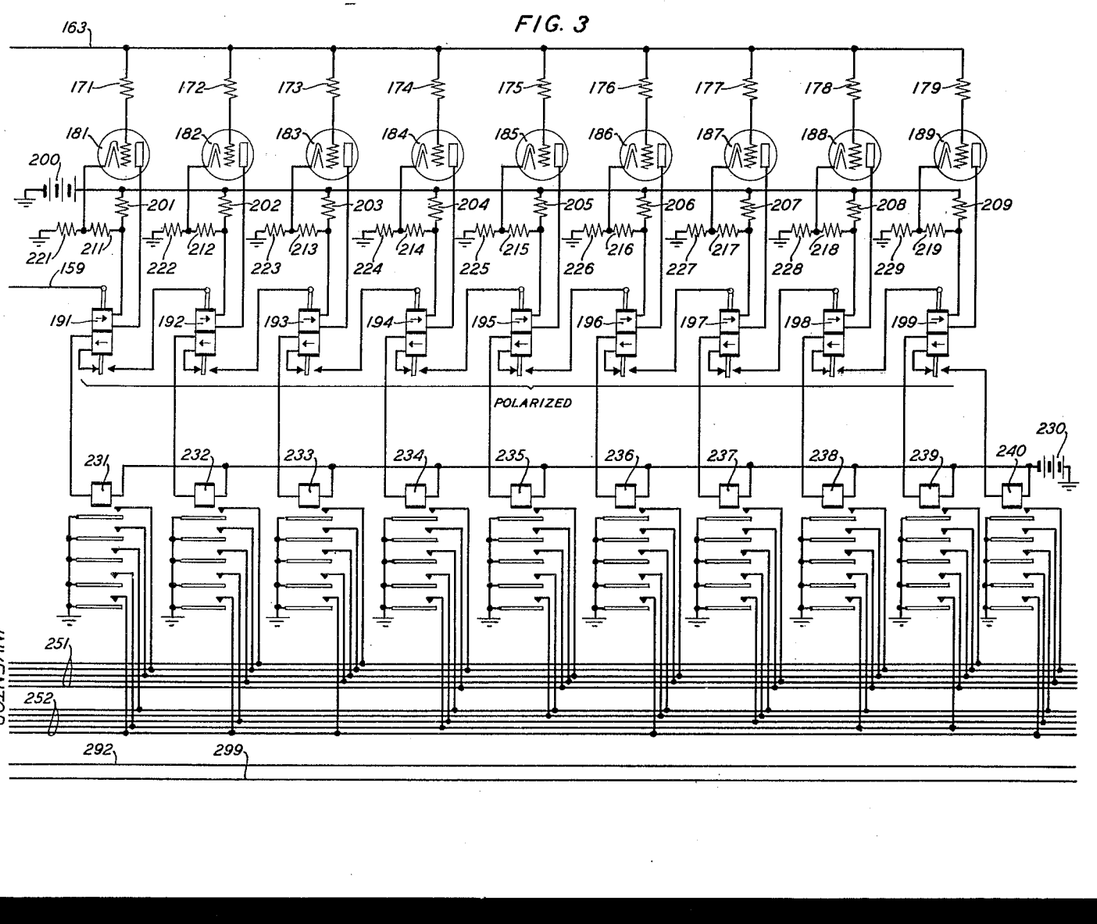

The total resistance of each of the potential dividers is the same and resistors 211, 212, 213, 214, 215, 216, 217, 218 and 219 have the same value so that the tubes in Fig. 3 have equal voltage between their anodes and cathodes. Resistors 222, 223, 224, 225, 226, 227, 228 and 229 are progressively of higher value than resistor 221 and accordingly resistors 202, 203, 204, 205, 206, 207, 208 and 209 are correspondingly progressively smaller than resistor 201. Thus the tubes 182, 183, 184, 185, 186, 187, 188 and 189 have progressively greater negative grid bias. Upon the operation of relay 140 to its right-hand or off-normal contact under the control of tube 91 in Fig. 2, condenser 164 begins to charge. The charging rate is adjustable by means of variable resistor 161 and as the condenser charges, the grids of the tubes in Fig. 3 swing positive with respect to ground. The constants of the condenser charging circuit are preferably such that tube 181 will be rendered sufficiently conductive to operate transfer relay 191 about .010 second after the armature of relay 140 reaches the right-hand contact. Thereafter, the remaining tubes in Fig. 3 are rendered conductive in succession as condenser 164 continues to charge and they become conductive at intervals dependent upon their individual grid bias values and the characteristics of the condenser charging circuit. In accordance with one embodiment of the invention, the constants of the condenser charging circuit and the grid bias values have been so chosen that the final tube 189 will be operated about .320 second after the interval measuring operation was started by activation of the oscillator in Fig. 1 and this interval is substantially equal to the time of two permutation code signal combinations including start and stop impulses at a signaling speed of sixty words per minute.

Conductor 159 which enters Fig. 3 from Fig. 2 is connected to the armature of transfer relay 191 and the left-hand or back or normal contact of the relay is connected through the locking winding of the relay and the winding of a coding relay 231 to the negative terminal of grounded battery 230. The right-hand or front or off-normal contact of relay 191 is connected to the armature of the next transfer relay 192. The left-hand or back or normal contacts of relays 192, 193, 194, 195, 196, 197, 198 and 199 are connected through locking windings of those relays and through the windings of coding relays 232, 233, 234, 235, 236, 237, 238 and 239 to battery 230. The right-hand or front or off-normal contact of each of these transfer relays with the exception of relay 199 is connected to the armature of the counting relay following it. The right-hand contact of relay 199 which is the last of the transfer relays is connected through the winding of coding relay 240 to battery 230. As each of the transfer relays in Fig. 3 is operated, it transfers the conductive path of conductor 159 from the winding of the coding relay associated with it to the winding of the coding relay associated with the next transfer relay. Finally the transfer relay 199 upon being operated, transfers the conductive path to the final coding relay 240.

Figures 4, 5:
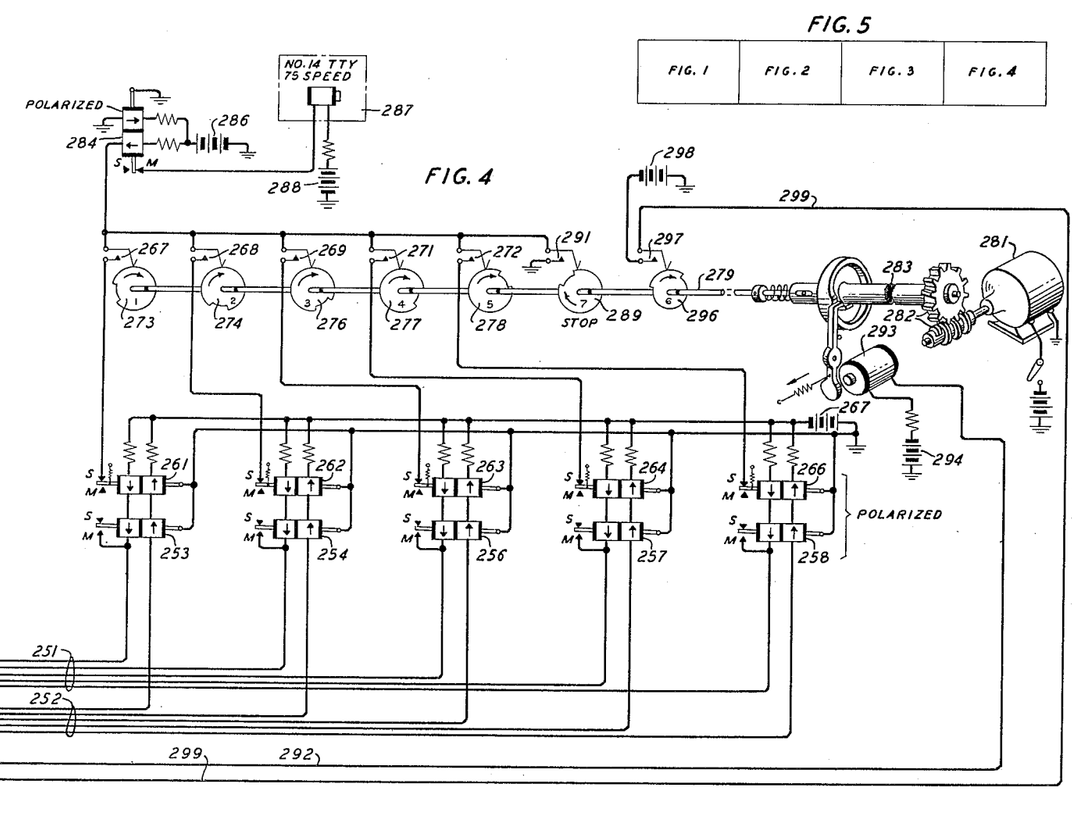

Each of the coding relays in Figs. 2 and 3 is provided with five grounded armatures and five front contacts. The five front contacts of each coding relay are connected in permutational combination to five of ten conductors, five of which are designated by the reference numeral 251 and the other five of which are designated by the reference numeral 252. The conductors 251 represent marking conditions and the conductors 252 represent spacing conditions. Conductors 251 extend into Fig. 4 and are connected through the marking operating windings of five polar locking relays 253, 254, 256, 257 and 258 and through the marking operating windings of five polar code storage relays 261, 262, 263, 264 and 266 to the negative terminal of grounded battery 267. Conductors 252 also extend into Fig. 4 and are connected through the oppositely poled spacing operating windings of locking relays 253, 254, 256, 257 and 258 and through the spacing operating windings of code storage relays 261, 262, 263, 264 and 266 to battery 267. The armatures of the locking and code storage relays in Fig. 4 are connected to ground. The armatures of code storage relays 261, 262, 263, 264 and 266 are mechanically biased toward their spacing contacts by individual springs. When any one of the coding relays in Figs. 2 and 3 is operated over the conductive path including conductor 130 or conductors 130 and 159, ground will be connected in permutational combination to the marking or spacing operating winding of each of the locking relays and each of the code storage relays in Fig. 4. Those relays which have the circuit of their marking operating windings completed will operate their armatures to the marking contacts, which in the case of the locking relays are connected to the five conductors 251 and in the case of the code storage relays are dead contacts. Each locking relay so operated establishes a locking circuit for itself and its associated code storage relay from ground through its armature and marking contact, its own marking operating winding and that of its associated code storage relay to battery 267. Any pair of relays in Fig. 4 comprising a code storage relay and associated locking relay which is already operated to the marking condition from ground on the armature of the locking relay through the marking contact, the marking operating windings of the locking relay and associated code storage relay to battery 267 will remain in that condition. Any of the pairs of relays which were previously in the marking condition and which have the circuits of their spacing operating windings completed by the coding relay will be operated to spacing and their locking circuits will be interrupted. The biasing springs associated with the armatures of the code storage relays 261, 262, 263, 264 and 266 hold the armatures in engagement with their spacing contacts, so that no locking of the code storage relays in the spacing condition is necessary, and their armatures will leave the spacing contacts only upon energization of their marking operating windings. The locking and code storage relays have no normal condition, but having been conditioned in accordance with the code represented by one of the coding relays of Figs. 2 and 3, they will remain in that condition until another coding relay operates and changes their combinational condition.

The spacing contacts of the five code storage relays are connected to normally open contacts 267, 269, 269, 271 and 272 of a machine transmitter comprising transmitting cams 273, 274, 276, 277 and 278 secured to a shaft 279 driven from motor 281 through gears 282 and normally disengaged jaw clutch 283. The transmitting contacts when closed extend a conductive path through the operating winding of a biased polar relay 284 to battery 286. The armature of relay 284 is grounded and the marking contact is connected through the selector magnet of a teletypewriter printer 287 to battery 288. Teletypewriter printer 287 may be of the same type as teletypewriter printer 17 in Fig. 1.

Shaft 279 also has secured thereto a start cam 289 for closing a pair of normally open contacts 291 representing the start impulse of telegraph signals. The machine transmitter operates on an inverse basis, by which is meant that a conductive path is completed from ground through the armature and spacing contacts of any one of the code storage relays and through the associated transmitting contacts when closed, and the operating winding of relay 284 to battery 286 to energize the operating winding of relay 284 and operate the armature to spacing to represent a spacing signal. When the operating winding of relay 284 is not energized, the armature of that relay is held on the marking contact by current through the biasing winding. This mode of operation is thus distinguished from another well-known mode of operation in which a transmitter passes current to the operating winding of a receiving relay for the marking condition, and interrupts the current for a spacing condition, the armature of the receiving relay being operated to its spacing contact by current in the biasing winding.

Throughout the foregoing description it has been assumed that relay 21 in Fig. 1 has been steadily operated to its marking condition in response to a rest impulse between code combinations transmitted from keyboard transmitter 11, that the oscillator had been in operation and that the counting mechanism of Fig. 2 or Figs. 2 and 3 had been performing their counting and time measuring operation. If the interval has been long enough for the counting system to run through to the end of its operation, the conductive path of conductor 159 will be extended through the winding of the last coding relay 240 to battery 230. If the end of the counting system has not been reached when relay 21 is operated to spacing in response to the start impulse of the next signal combination received from transmitter 11, the path will be extended through the winding of one of the coding relays preceding the relay 240 to battery 230. Upon the movement of the armature of relay 21 of Fig. 1 away from its marking contact, it interrupts the energizing circuit of the upper winding of relay 158. This relay is a spring biased polar relay and the armature will be operated by the biasing spring to its right-hand contact. As the armature of relay 21 reaches its spacing contact, it reestablishes the flow of current through the inductance coils 48 and 49, thus stopping the oscillator and preventing further counting operation of the counting chain in Fig. 2 if that chain has not already counted through to the last counting tube 129.

Relay 158 upon being operated to its right-hand contact completes a circuit from ground through the armature and right-hand contact of the relay, conductors 157 and 156 through the armatures and right-hand contacts of as many of the transfer relays in Fig. 2 as are operated and if all are operated through conductor 159 extending into Fig. 3 and the armatures and right-hand contacts of as many of the transfer relays as are operated in Fig. 3 and through the left-hand contact and locking winding of the first unoperated transfer relay and the winding of the coding relay associated therewith to battery 150 or battery 230. In case all of the transfer relays have been operated, then the circuit will not include the locking winding of any transfer relay but will be extended through the armature and right-hand contact of relay 199 and through coding relay 240 to battery 230. The coding relay which is operated will attract its grounded armatures and complete the circuits of marking and spacing windings of the locking and code storage relays in Fig. 4 to condition those relays in accordance with the code combination assigned to the energized coding relay.

Relay 158 also completes a circuit from ground through its armature and right-hand contact, conductor 157, conductor 292 extending through Figs. 2 and 3 and into Fig. 4 and winding of clutch magnet 293 to battery 294. With clutch magnet 293 energized, clutch 283 is permitted to become engaged to drive shaft 279 and the cams carried thereby. Cam 289 first permits contacts 291 to close operating relay 284 to spacing for the start impulse of the signal and after the cam has reopened contacts 291 the cams, 273, 274, 276, 277 and 278 successively permit closure and effect reopening of their contacts 267, 268, 269, 271 and 272, respectively, for the transmission into relay 284 of the significant impulses of the code combinations.

About the time that cam 289 reopens the contacts 291, a cam 296 carried by shaft 279 permits contacts 297 to close. These contacts complete a circuit from battery 298, closed contacts 297, conductor 299, extending from Fig. 4 through Figs. 3 and 2 into Fig. 1 and operating winding of a relay 301 to ground. The armature of relay 301 is connected to positive battery 302 and the left-hand contact which the armature normally engages is connected to conductor 130 which extends into Fig. 2 and as previously described has connected to it the main anodes of the tubes in Fig. 2 through the operating windings of their associated transfer relays, and in the case of tube 91, through the operating winding of relay 140 in addition to the transfer relay associated with the tube. Upon movement of the armature of relay 301 out of engagement with its left-hand contact, battery 302 is disconnected from this circuit thereby quenching all of the tubes in Fig. 2 and releasing as many of the transfer relays as have been operated and if all have been operated, releasing the relay 140. Relay 140 restores its armature to the left-hand contact, thereby reconnecting ground to conductor 163 to discharge condenser 164 and to restore the grids of the tubes in Fig. 3 to cut-off potential. With the tubes cut off, any of the transfer relays in Fig. 3 that were operated are released.

The armature of relay 301 moves into engagement with its right-hand contact and completes the energizing circuit of the lower winding of relay 158. This winding has the same operative effect on the armature as the upper winding and accordingly restores the armature to the left-hand contact, thereby disconnecting ground from conductor 156. The effect of this is to open the energizing circuit through the operated one of the coding relays in Figs. 2 or 3 and through the locking winding of the associated transfer relay, thereby releasing the coding relay. The interruption of the circuit through the locking winding of the associated transfer relay does not effect any change in the condition of that relay because the effect of the locking winding when energized is to hold the armature on the normal or left-hand contacts so as to prevent interruption of the circuit of a coding relay which has been energized, should the operating winding of its associated transfer relay become energized after relay 158 has connected ground through conductor 157 to conductor 156.

With relay 158 operated to its left-hand contact under the control of relay 301, the energizing circuit of clutch magnet 293 including conductors 157 and 192 is also interrupted. With the clutch magnet released, clutch 283 will be disengaged at the end of one revolution and shaft 279 and the cams carried thereby will be stopped. Contacts 297 are opened by cam 296 shortly before the end of the revolution of shaft 279, at which time the stop impulse of the code combination received from keyboard transmitter 11 is being or is about to be received, the armature of receiving relay 16 is engaging or is about to engage its marking contact, gas-filled tube 23 has been or is about to be refired to complete the energizing circuit for the operating winding of relay 21 to operate its armature to the marking contact, thus to complete the circuit of the upper winding of relay 158, which maintains its grounded armature on the left-hand contact after contact 297 opens and relay 301 operates its armature to its left-hand contact by the action of its biasing winding, interrupting the energizing circuit of the lower winding of relay 158 and reestablishing, over conductor 130, the anode circuit for the gas-filled tubes in Fig. 2 through the operating windings of the transfer relays in Fig. 2. With relay 21 operated to its marking contact, the flow of unidirectional current through oscillator coils 48 and 49 is interrupted, the resonant circuit breaks into oscillation and begins operating the counting circuit for timing the interval preceding reception of the next code combination.

Consideration will now be given to a particular sequence of operations initiated upon response of relay 16 to the start impulse of a received code combination. Relay 21 is operated to spacing and interrupts the energizing curcuit of the upper winding of relay 158, permitting the spring of this relay to operate the armature to the right-hand contact. Over conductors 157 and 156 the locking winding of the first unoperated transfer relay in Figs. 2 or 3 and the winding of the associated coding relay are energized. Concurrently, over conductors 157 and 292, clutch magnet 293 is energized. Clutch 283 becomes engaged and shaft 279 begins to rotate. By the time that the end of the start impulse generated by contact 291 is approached, code storage relays 261, 262, 263, 264 and 266 and associated locking relays 253, 254, 256, 257 and 258 will have been conditioned in accordance with the code combination represented by the operated coding relay in Fig. 2 or Fig. 3. Near the end of the start impulse generated by contacts 291, contacts 297 close and complete the energizing circuit of relay 301 which restores relay 158 to its normal condition, which in turn interrupts the energizing circuit for the locking winding of the last unoperated transfer relay and the winding of the associated coding relay and also interrupts the energizing circuit for clutch magnet 293. This series of operations requires appreciable time and the outer dwell on cam 296 is of such length that as much time as possible shall be allowed for the energization of a coding relay and for the setting of the code storage relays before the energizing circuit for the coding relay is interrupted. With relay 21 operated to spacing, and the generation of oscillatory current by the resonant circuit interrupted, the activation of further gas-filled tubes in Fig. 2, if the counting chain has not already counted to the end, is prevented. However, if the counting chain in Fig. 2 is completely operated and condenser 164 is charging and is operating the counting chain of Fig. 3, the stopping of the oscillator in Fig. 1 will have no effect on the charging circuit for condenser 164 and condenser 164 will not be discharged and the counting operation of the tubes in Fig. 3 will continue until relay 301 operates to its right-hand contact and disconnects battery 302 from conductor 130, thereby releasing relay 140. The interval between response of relay 21 to reception of the spacing impulse and the operation of relay 301 to its right-hand contacts may be sufficient for condenser 164 to activate one, two or three of the counting tubes in Fig. 3, depending upon the allotted intervals between the tubes as determined by the constants of the condenser charging circuit, and particularly if the counting chain in Fig. 3 has just begun to operate, at which point the intervals for operation of successive tubes are shorter than they are at the far end of the counting chain. Assume, for example, that at the time of operation of relay 21 to spacing and operation of relay 158 to its right-hand contact, transfer relay 191 in Fig. 3 is operated and transfer relay 192 is unoperated because tube 182 has not yet been activated. Ground connection will be extended over conductors 157 and 156, the armatures and right-hand contacts of all of the transfer relays in Fig. 2, conductor 159, the armature and right-hand contact of transfer relay 191, the armature and left-hand contact and locking winding of unoperated transfer relay 192 and coding relay 232 to battery 230. This circuit will be maintained until contact 297 in Fig. 4 closes and operates relay 301 in Fig. 1, which in turn operates relay 158 to its left-hand contact. In the meantime the condenser charging circuit may have raised the grid of tube 182 and possibly tubes 183 and 184 to sufficient potential to render those tubes conductive. The upper or operating winding of relay 192 thus becomes energized and seeks to move the armature to the right-hand contacts, which would interrupt the energizing circuit of the locking winding of that relay and also interrupt the winding of relay 232. The locking winding of relay 192 dominates that relay when energized and prevents the operating winding from operating the armature to the right-hand contact so that coding relay 232 remains energized and the conductive path of conductor 159 is not transferred to the armature of relay 193. If tube 183 becomes conductive, the operating winding of relay 193 will be energized and the armature will be operated to the right-hand contact. If tube 184 should become conductive before relay 301 operates and condenser 164 is discharged, relay 194 will also be operated. The operation of these relays will produce no change in the condition of the coding relays or the code storage relays because their armatures are disconnected from the conductive path of conductor 159 at the right-hand contact of relay 192. Thus effective counting operation of the counting system in Fig. 3 is interrupted when relay 21 and in turn relay 158 respond to reception by relay 16 of the start impulse, although additional counting tubes in Fig. 3 may in fact be operated. Although continued operation of the counting chain of tubes in Fig. 2 cannot occur following operation of relay 21 to its spacing contact, assuming that the counting chain has not counted to the end, because of the fact that the oscillator is stopped and the counting chain requires additional pulses to continue counting, nevertheless the same type of locking circuits have been provided for the transfer relays in Fig. 2, as a safeguard against accidental activation of the first unoperated tube and consequent interference with the coding relays after one has been energized.

The transmitter in Fig. 4 comprising cams 273, 274, 276, 277, 278 and 279 and the printer 287 preferably operate at a higher speed of signal transmission than the keyboard transmitter 11 and printer 17 in Fig. 1. For example if printer 17 is arranged to receive telegraph signals at a rate of about 60 words per minute, as previously mentioned, the transmitter and printer in Fig. 4 may operate at a signal transmission speed of 75 words per minute. The reason for this is that the previously described sequence of operations leading up to the energization of clutch magnet 293 causes the initiation of the start pulse by contacts 291 to occur an appreciable interval after relay 16 responds to the start pulse of a signal combination transmitted from keyboard transmitter 11. With this relationship the transmitter in Fig. 4 may complete its transmitting operation and the printer 287 may complete its receiving operation within the interval in which printer 17 is receiving the signal combination from keyboard transmitter 11. Were it not for this relationship, and if the transmitter and printer in Fig. 4 should operate at the same speed, but with the lag due to the series of operations hereinbefore described, the operation of the transmitter and printer in Fig. 4 would extend over into the interval which the measuring system of Figs. 2 and 3 would begin to measure upon operation of relay 21 to marking responsive to the stop signal received by relay 16. If the interval should be very short, due to almost immediate reception of a start impulse by relay 16, so that not even the tube 82 in Fig. 2 should have an opportunity to be fired and operate relay 132, or if only the relay 132 of the transfer relays in Fig. 2 should become operated, the coding relays 142 or 143 might become operated and change the condition of the code storage relays in Fig. 4 before the signal combination stored therein had been completely transmitted to printer 287. By operating the transmitter and the printer in Fig. 4 at the higher operating speed, the code combination representing the measured interval will have been completely transmitted by the transmitter in Fig. 4 to printer 287 by the time relay 21 again starts the oscillator in Fig. 1 under the joint control of relay 16 responding to the stop impulse of the received code combination and the timing tube 23.

Printer 287 will record one character, representing the interval preceding each signal combination received from keyboard transmitter 11. For the number of coding relays shown in Figs. 2 and 3 and assuming that they represent letter code combinations in alphabetical order, any one of the characters A to R will be printed. The first character printed by printer 287 following any interruption in transmission from keyboard transmitter 11 will be the letter R which represents the maximum interval that the measuring system is adapted to measure. Thereafter, providing no intervals longer than the interval represented by the letter R intervene, the characters printed will represent the actual intervals between code combinations received from keyboard transmitter 11, it being remembered that intervals are measured in increments of time, these increments being fixed and equal in the case of the counting chain shown in Fig. 2 and fixed but not necessarily equal in the case of the counting chain in Fig. 3, and that the counting system takes no cognizance of fractions of such increments.

If a machine transmitter, such as a tape transmitter for example, should be substituted for keyboard transmitter 11, printer 287 will invariably print the letter A, because the interval between code combinations transmitted by a keyboard transmitter is less than the interval in which tube 82 will be operated under the control of the oscillator.

It has been found convenient to employ tape printers as the printers 17 and 287 in Figs. 1 and 4, respectively. One advantage of this is that the tapes may be placed side by side and compared in order to determine whether there are recurrent letters in the tape produced by printer 287 relative to recurrent characters in the tape produced by printer 17. Another advantage in the use of tape printers particularly for the printer 287 is that it is not necessary to provide for the periodic transmission of carriage return and line feed signals to that printer from the transmitter in Fig. 4. In making a comparison between the copy produced by the two printers it must be borne in mind that the printer 287 produces a character for every signal combination transmitted from the keyboard transmitter 11 whereas no corresponding character will appear in the copy produced by printer 17 for non-printing function signals such as "shift" and "unshift." This points to another advantage in using a tape printer as the printer 17, namely, that the number of non-printing functions may be minimized, since it is not necessary to transmit carriage return and line feed signals for the operation of a tape printer. However, it may be desirable to include all possible functions in a study of keyboard techniques, in which case the disparity between the number of characters in the two tapes introduced by all of the non-printing functions must be kept in mind.

Figure 6:
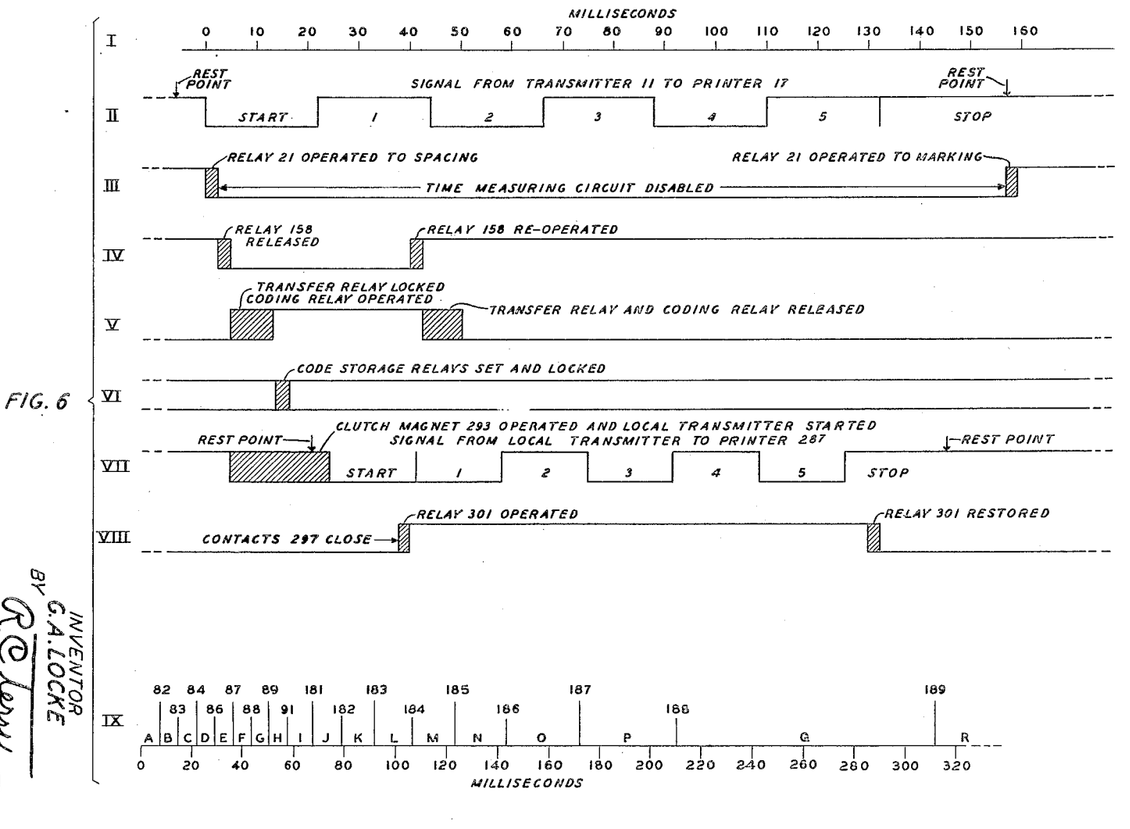
Fig. 6 shows a set of representative timing diagrams.

Fig. 6 comprises a series of timing diagrams to illustrate graphically the sequence of operations beginning with reception of a signal combination by receiving relay 16 of Fig. 1. Diagram I represents a time scale in milliseconds for an interval of one signal combination. Diagram II represents a start-stop permutation code signal combination received by relay 16 at a signaling speed of 60 words per minute. Diagram II is related to Diagram I in such manner that time runs from the beginning of the start signal. The cycle of the transmitter from which the signal is transmitted begins and ends with the indicated rest points of Diagram II, from which it is seen that the transmitting distributor operates for a brief interval before the stop contacts are opened for the transmission of the start impulse. This interval is of the order of 6 milliseconds. The transmitter comes to rest about 163 milliseconds later or 157 milliseconds after the beginning of the start impulse.

Diagram III represents the timing of relay 21. This relay is released upon response of receiving relay 16 to the start impulse, to disable the time measuring circuit and prevent a cumulative counting of further time increments. As previously described, this relay is prevented from reoperating to marking in response to marking impulses in the code combination or in response to the beginning of the stop impulse, by the character timing tube 23, which permits the relay to reoperate to marking about the time of the rest point in the stop signal. The shaded portion of this diagram represents approximately the operating time of the relay, by which is meant the time elapsing between the opening of the energizing circuit of the operating winding and the arrival of the armature at its spacing contact, in the case of the first shaded portion and the interval between the reestablishment of the energizing circuit for the operating winding and the disengagement of the armature from the spacing contact in the case of the second shaded portion.

Diagram IV represents the operating cycle of relay 158. This relay is released upon operation of relay 21 away from its marking contact and in turn completes the energizing circuit for the locking winding of the first unoperated transfer relay and for the coding relay associated therewith. The operation of the coding relay is represented in Diagram V, and due to the fact that it has five armatures to operate its operating time is appreciably slower than that of polar relays such as the relay 21 and relay 158, as indicated by the more extensive shaded portions of Diagram V. Relay 158 also causes the energization of clutch magnet 293, Fig. 4 and the starting of the local transmitter shown therein. The operation of the local transmitter is represented in Diagram VII. Clutch magnet 93 may also be relatively slow in operating because it is operable not only in opposition to its restoration spring but also in opposition to frictional resistance between the clutch throw-out lever which the clutch magnet controls and the driven portion of clutch 283. The shaded portion of Diagram VII represents a possible interval required to energize the clutch magnet 293, engage clutch 283, impart rotation to shaft 279 and rotate it until contact 291 closed under the influence of cam 289. The rest point of the operator for contacts 291 relative to cam 289 is indicated.

While the operations represented by the shaded portion of Diagram VII are in progress, the coding relay becomes operated as indicated in Diagram V and conditions or sets the code storage relays and their locking relays in accordance with the code combination assigned to the coding relay, some of the unoperated code storage relays being operated and some of the operated ones being released as represented by the two lines of Diagram VI. The shaded portion of this diagram indicates the approximate time interval required to set and lock these relays.

Diagram VIII represents the operation of relay 301 from its left-hand to its right-hand contact due to closure of contacts 297 near the end of the start impulse generated by the local transmitter. As a result of the operation of this relay, the relay 158 is reoperated as represented by the second shaded portion of Diagram IV and this relay in turn releases the locked transfer relay and the operated coding relay as represented by the second shaded portion of Diagram V.

Diagram VII includes a representation of a code combination transmitted from the local transmitter to printer 287, and the scale of this chart is on the basis of a transmitting speed of 75 words per minute so that the chart indicates graphically the statement hereinbefore made that the local transmitter completely transmits its signal combination, representing a measured time interval, within the interval in which the impulses of the code combination transmitted from transmitter 11 are received. Shortly before the local transmitter comes to rest, it reopens contacts 297, which cause the relay 301 to be restored to its initial condition as represented by the second shaded portion of Diagram VIII. The conditions represented at the right-hand ends of Diagrams II and VIII continue with the time measuring circuit enabled and measuring the interval preceding the next code combination arriving from transmitter 11 and upon reception of the start impulse of such code combination, the operations represented in the charge are repeated.

Diagram IX is a timing diagram representing the time measuring operation occurring upon each reoperation of relay 21 to marking as represented in Diagram III. Time is indicated in milliseconds and the lines extending vertically from the time scale represent the instants at which the designated counting tubes will be rendered conductive. The first eight tubes are operable at the end of equal increments of time because they are operated under the control of the oscillator as previously stated. The remaining nine tubes are operated after increasingly longer increments of time in accordance with constants of the condenser-charging circuit and the negative bias on the several tubes as hereinbefore described. The characters which are assigned to represent the various increments of time are shown adjacent to the time scale. The disablement of the time measuring circuit in accordance with Diagram III within any of the increments of time shown in Diagram IX will result in the printing by printer 287 of the character applied to that increment.

Fig. 6 is to be interpreted merely as representing one set of relationships in accordance with which the system disclosed in Figs. 1 to 4 may be operated, and not in any way limiting the scope of the invention or precluding the use of other sets of relationships. The operating intervals represented by the several shaded portions are to be understood as indicating merely that small but determinable operating times are inherent in the system disclosed. The shaded portions do not necessarily represent actual operating times. It should also be understood that the number of tubes employed for counting time increments as shown in Figs. 2 and 3 and as indicated in Diagram IX may be increased or decreased as desired and that the increments of time to be counted thereby may also be increased or decreased as desired.

Although a particular embodiment of the invention has been shown in the drawings and described in the foregoing specification, it is to be understood that the invention is not limited to such specific embodiment but is capable of modification and rearrangement without departing from the spirit of the invention and within the scope of the appended claims.

What is claimed is:

1. In a device for measuring time intervals, means for counting discrete increments of time, means controlled by said counting means for generating code signals individual to and representative of said increments, means for causing to be generated only the signal representing the last increment in any time interval, and means controlled by said signal generating means for recording a character indicative of each signal generated.

2. In a device for measuring time intervals, means for counting a predetermined number of fixed and equal increments of time, further means for thereafter counting a plurality of unequal and progressively longer increments of time, means controlled by said counting means for generating code signals individual to and representative of each increment, and means controlled by said signal generating means for recording a character indicative of each signal generated.

3. In a device for measuring time intervals, means for counting discrete increments of time, means controlled by said counting means for generating permutation code signals individual to and representative of each increment, means for causing to be generated only the code signal representing the last increment in any time interval, and a printing telegraph recorder controlled by said signal generating means for recording a character indicative of each signal generated.

4. In a device for measuring time intervals, means for generating impulses equally spaced in time, means for counting said impulses, means controlled by said counting means for generating code signals individual to and representative of said impulses, means for causing to be generated only the signal representing the last impulse in any time interval, and means controlled by said signal generating means for recording a character indicative of each signal generated.

5. In a device for measuring time intervals, means for generating impulses equally spaced in time, means for counting a predetermined number of said impulses, a condenser and a charging circuit therefor, means controlled by said counting means upon counting said predetermined number of impulses for activating said condenser charging circuit, a plurality of potential responsive means controlled by said condenser for manifesting in steps the charging of said condenser, means controlled by said counting means and said potential responsive means for generating code signals individual to and representative of said impulses and said steps, and means controlled by said signal generating means for recording a character indicative of each signal generated.

6. In a device for measuring time intervals, an oscillator, means controlled by said oscillator for generating impulses at the rate of one impulse per cycle of said oscillator, means for counting a predetermined number of said impulses, a condenser and a charging circuit therefor, means controlled by said counting means upon counting said predetermined number of impulses for activating said condenser charging circuit, a plurality of potential responsive means controlled by said condenser for manifesting in steps the charging of said condenser, means controllable either by said counting means or said potential responsive means for generating code signals individual to and representative of said impulses and said steps, and means controlled by said signal generating means for recording a character indicative of each signal generated.

7. In a device for measuring time intervals, an oscillator, means for starting said oscillator at the beginning of an indeterminate interval to be measured, means for stopping said oscillator at the termination of said interval, means for generating impulses at the rate of one impulse per cycle of said oscillator, means for counting a predetermined number of said impulses, a condenser and a charging circuit therefor, means controlled by said counting means upon counting said predetermined number of impulses for activating said condenser charging circuit, a plurality of potential responsive means controlled by said condenser for manifesting in steps the charging of said condenser, means controllable either by said counting means or said potential responsive means for generating a signal individual to and representative of said impulses and said steps, and means controlled by said signal generating means for recording a character indicative of each signal generated.

8. In a device for measuring time intervals between cycles of an instrumentality operable in cycles initiated at random, an oscillator normally in operation when said instrumentality is at rest, means controlled by said oscillator for generating impulses at the rate of one impulse per cycle of said oscillator, means for counting a predetermined number of said impulses, a condenser and a charging circuit therefor, means controlled by said counting means upon counting said predetermined number of impulses for activating said condenser charging circuit, a plurality of potential responsive means controlled by said condenser for manifesting in steps the charging of said condenser, means controllable either by said counting means or said potential responsive means for generating code signals individual to and representative of said impulses and said steps, means responsive to initiation of a cycle of said instrumentality for stopping said oscillator and for activating said signal generating means, and means controlled by said signal generating means for recording a character indicative of the signal generated.

9. In a device for measuring time intervals between cycles of an instrumentality operable in cycles initiated at random, an oscillator normally in operation when said instrumentality is at rest, means controlled by said oscillator for generating impulses at the rate of one impulse per cycle of said oscillator, means for counting a predetermined number of said impulses, a condenser and a charging circuit therefor, means controlled by said counting means upon counting said predetermined number of impulses for activating said condenser charging circuit, a plurality of potential responsive means controlled by said condenser for manifesting in steps the charging of said condenser, means controllable either by said counting means or said potential responsive means for generating code signals individual to and representative of said impulses and said steps, means responsive to initiation of a cycle of said instrumentality for stopping said oscillator and for activating said signal generating means, means controlled by said signal generating means for recording a character indicative of the signal generated, and means for restarting said oscillator coincident with the end of the cycle of said instrumentality.

10. In a device for measuring time intervals, means for generating impulses equally spaced in time, means for counting a predetermined number of said impulses, a condenser and a charging circuit therefor, means controlled by said counting means upon counting a predetermined number of impulses for activating said condenser charging circuit, a plurality of potential responsive means controlled by said condenser for manifesting in steps the charging of said condenser, means controllable either by said counting means or said potential responsive means for coding signals individual to and representative of said impulses and said steps, means for transmitting said coded signal, a recorder responsive to said transmitting means for recording a character indicative of the signal transmitted by said transmitting means, and means controlled by said transmitting means for restoring said counting means, said condenser charging circuit and said potential responsive means to unoperated condition.

11. In a device for measuring time intervals, means for generating impulses equally spaced in time, a counting chain of electron discharge tubes for counting a predetermined number of said impulses, a transfer relay associated with each of said discharge tubes by having its operating winding connected in the anode circuit of the tube, a locking winding for each of said relays energizable through the armature and back contact of the relay for locking the relay in unoperated condition, a coding relay associated with each of said transfer relays by having its operating winding energizable in series with the locking winding of the transfer relay, means operable at the end of an interval to be measured for completing the circuit of the locking winding of the first unoperated transfer relay and the operating winding of the associated coding relay, means controlled by the operated coding relay for generating a signal combination individual to and representative of the coding relay, and means controlled by said signal generating means for recording a character indicative of said code combination.

12. In a device for measuring time intervals, means for generating impulses equally spaced in time, a counting chain of electron discharge tubes for counting a predetermined number of said impulses, a condenser and a charging circuit therefor, means controlled by said counting chain upon counting said predetermined number of impulses for activating said condenser charging circuit, a series of other electron discharge tubes having their grids connected to said condenser and having their cathodes progressively more positive than their grids whereby said other electron discharge tubes are rendered conductive in succession as said condenser charges, a transfer relay associated with each of said discharge tubes by having its operating winding connected in the anode circuit of the tube, a locking winding for each of said relays energizable through the armature and back contact of the relay for locking the relay in unoperated condition, a coding relay associated with each of said transfer relays by having its operating winding energizable in series with the locking winding of the transfer relay, means operable at the end of an interval to be measured for completing the circuit of the locking winding of the first unoperated transfer relay and the operating winding of the associated coding relay, means controlled by the operated coding relay for generating a signal combination individual to and representative of the coding relay, and means controlled by said signal generating means for recording a character indicative of said signal combination.

13. In a device for measuring time intervals, means for generating impulses equally spaced in time, a counting chain of electron discharge tubes for counting a predetermined number of said impulses, a condenser and a charging circuit therefor, means controlled by said counting chain upon counting said predetermined number of impulses for activating said condenser charging circuit, a series of other electron discharge tubes having their grids connected to said condenser and having their cathodes progressively more positive than their grids whereby said other electron discharge tubes are rendered conductive in succession as said condenser charges, a transfer relay associated with each of said discharge tubes by having its operating winding connected in the anode circuit of the tube, a locking winding for each of said relays energizable through the armature and back contact of the relay for locking the relay in unoperated condition, a coding relay associated with each of said transfer relays by having its operating winding energizable in series with the locking winding of the transfer relay, means operable at the end of an interval to be measured for completing the circuit of the locking winding of the first unoperated transfer relay and the operating winding of the associated coding relay, means controlled by the operated coding relay for generating a signal combination individual to and representative of the coding relay, means controlled by said signal generating means for recording a character indicative of said signal combination, and means also controlled by said signal generating means for restoring said counting chain to unoperated condition and for deactivating said condenser charging circuit and discharging said condenser.

14. In a device for measuring time intervals, means set in operation at the beginning of an interval to be measured for generating impulses equally spaced in time, a counting chain of cold cathode electron discharge tubes for counting a predetermined number of said impulses, a condenser and a charging circuit therefor, means controlled by said counting chain upon counting said predetermined number of impulses for activating said condenser charging circuit, a plurality of grid-controlled vacuum electron discharge tubes having their grids connected to said condenser and having their cathodes progressively more positive with respect to their grids whereby to be rendered conductive in succession by the charging of said condenser, a transfer relay associated with each of said cold cathode and vacuum electron discharge tubes by having its operating winding connected in the anode circuit of the tube, a locking winding for each of said relays energizable through the armature and back contact of the relay for locking the relay in unoperated condition, a coding relay associated with each of said transfer relays by having its operating winding energizable in series with the locking winding of the transfer relay, means operable at the end of an interval to be measured for completing the circuit of the locking winding of the first unoperated transfer relay and the operating winding of the associated coding relay, means controlled by the operated coding relay for generating a signal combination individual to and representative of the coding relay, means controlled by said signal generating means for recording a character indicative of said signal combination, and means also controlled by said signal generating means for quenching the tubes of said counting chain and for deactivating said condenser charging circuit and discharging said condenser.

15. In a device for measuring time intervals, means for generating impulses equally spaced in time, a counting chain of electron discharge tubes for counting a predetermined number of said impulses, a transfer relay associated with each of said discharge tubes by having its operating winding connected in the anode circuit of the tube, a connection from the front contact of each of said relays to the armature of the relay associated with the next tube in said chain, a locking winding for each of said relays energizable through the armature and back contact of the same relay for locking the relay in unoperated condition, a coding relay associated with each of said transfer relays by having its operating winding energizable in series with the locking winding of the transfer relay, means operable at the end of an interval to be measured for connecting a source of potential to the armature of the transfer relay associated with the first tube of said chain whereby to extend said connection through the armatures and front contacts of all operated ones of said transfer relays and through the armature and back contact of the first unoperated transfer relay to the locking winding of said first unoperated transfer relay and associated coding means, means controlled by the operated coding relay for generating a signal combination individual to and representative of the coding relay, means controlled by said signal generating means for recording a character indicative of said code combination, and means also controlled by said signal generating means for disconnecting said source of potential from the armature of the transfer relay associated with the first tube in said counting chain and for restoring said chain to unoperated condition.

16. In a device for testing keyboard telegraph signal transmitter operating techniques, a keyboard transmitter, a receiving printer responsive to signals generated by said transmitter, a series of counting instrumentalities for counting increments of time entering into the interval between the end of any signal combination and the beginning of the next signal combination received from said transmitter by said printer, means controllable by each of said counting instrumentalities for setting up a character code signal individual to said counting instrumentality, means for causing only the code signal setting-up means associated with the first unoperated counting instrumentality in any counting cycle to operate, and means controlled by the operated code signal setting-up means for recording a character corresponding to said code signal.

17. In a device for testing operation of a keyboard telegraph signal transmitter, a series of counting instrumentalities for counting increments of time entering into intervals between the end of one signal combination and the beginning of the next signal combination generated by a telegraph signal transmitter, means controllable by each of said counting instrumentalities for setting up a character code signal individual to said counting instrumentality, means for causing only the code setting-up means associated with the first unoperated counting means in any counting cycle to be operated, a telegraph transmitter controlled by the actuated one of said code setting-up means, and a teletypewriter printer adapted to receive the signals transmitted by the last-mentioned telegraph transmitter and to record the character represented thereby, whereby each recorded character is indicative of the duration of the interval between two signal combinations transmitted by said keyboard transmitter.

18. In a device for measuring time intervals, a plurality of devices each adapted to count one of a number of equal increments of time entering into the interval to be measured, means controllable by said counting devices for generating code signals individual to the increments represented by said counting devices, means for activating said signal generating means only in response to the last increment of any interval, and means for recording a character indicative of each signal generated.

19. In a device for measuring time intervals, a plurality of devices each adapted to count one of a predetermined number of equal increments of time entering into the interval to be measured, a further plurality of devices each adapted to count one of a plurality of unequal and progressively longer increments of time entering into the interval to be measured, means controllable by said counting devices for generating code signals individual to the increments represented by said counting devices, means for activating said signal generating means only in response to the last increment of any interval, and means for recording a character indicative of each signal generated.

GEORGE A. LOCKE.

REFERENCES CITED

The following references are of record in the file of this patent:

UNITED STATES PATENTS

| Number | Name | Date |
|---|---|---|
| 2,083,849 | Litstrom | June 15, 1937 |
| 2,216,730 | Berger | Oct. 8, 1940 |
| 2,332,300 | Cook | Oct. 19, 1943 |
| 2,342,318 | Wilkerson | Feb. 22, 1944 |
| 2,348,744 | McMurry | May 16, 1944 |
| 2,349,810 | Cook | May 30, 1944 |
| 2,422,698 | Miller | June 24, 1947 |